United States Patent
Cowan et al.

[11] Patent Number: 6,115,743
[45] Date of Patent: Sep. 5, 2000

[54] INTERFACE SYSTEM FOR INTEGRATED MONITORING AND MANAGEMENT OF NETWORK DEVICES IN A TELECOMMUNICATION NETWORK

[75] Inventors: Daniel Edward Cowan; Darren Jay Stautz; Mark B. Turner, all of Colorado Springs, Colo.

[73] Assignee: MCI Worldcom, Inc., Washington, D.C.

[21] Appl. No.: 09/158,742

[22] Filed: Sep. 22, 1998

[51] Int. Cl.[7] .................................................. G06F 15/173
[52] U.S. Cl. ........................................... 709/224; 709/223
[58] Field of Search .......................... 455/423; 340/506; 345/329; 379/26; 709/223, 224

[56] References Cited

U.S. PATENT DOCUMENTS

| 5,285,494 | 2/1994 | Sprecher et al. ........................ 455/423 |
| 5,452,415 | 9/1995 | Hotka ...................................... 345/329 |
| 5,920,257 | 7/1999 | Commerford ........................... 340/506 |
| 5,946,373 | 8/1999 | Harris ........................................ 379/26 |

*Primary Examiner*—Le Hien Luu

[57] ABSTRACT

A graphical user interface (GUI) system is provided for managing and controlling multiple network devices and client applications in a telecommunications network. The GUI system provides an integrated environment in which a user sends instructions and data to the network devices and client applications and receives back data related to status of the network devices and client applications. The integrated environment allows the user to access many window screens which are all tied into one main window. The many window screens provide options for commands and views of data related to various areas of management and control of the telecommunications network. The one main window provides a point of reference so that the user does not have to log onto various systems numerous times or use different terminals dependent upon which command or data the user desires to send or receive. Training and operational time and costs are thus reduced from prior art systems.

20 Claims, 13 Drawing Sheets

INTERFACE SYSTEM FOR INTEGRATED MONITORING AND MANAGEMENT OF NETWORK DEVICES IN A TELECOMMUNICATION NETWORK

TECHNICAL FIELD

The present invention relates to telecommunications networks and, more particularly, to a graphical user interface (GUI) system for integrated monitoring and management of network devices in a telecommunications network.

BACKGROUND OF THE INVENTION

Telecommunication networks, such as telephone networks, include a number of different components. Typically, telecommunication networks include network devices that are interconnected by links that facilitate communications. Examples of network devices are digital cross connects (DXCs), multiplexing equipment, line termination equipment, computer systems, and fiber transmission systems. A "link," as generally used herein, is a physical connection between the network devices that carry network traffic. A single link may include multiple trunks which are logical channels of communication.

Monitoring and managing telecommunications networks using prior art systems is difficult due to the mixture of different types of systems and interfaces involved. For example, a restoration system that restores traffic in a telecommunications network after a failure must be able to communicate with each of the different types of restoration devices. These restoration systems require human intervention in which many restoration functions are performed by restoration management staff. These restoration functions include monitoring the network, analyzing network problems, configuring network devices and communications links, managing restoration systems, and manual control of network devices (e.g., restoration devices) used in particular to restore the network to a normal operational condition.

Prior art restoration systems enable users to perform some of the restoration functions from a single computer terminal. A computer terminal is well known in the art and includes a display screen and an input device, such as a keyboard. However, in the prior art, restoration management (RM) staff must use many different RM systems, which entails accessing the various RM systems with different interfaces displayed on display screens of one or more RM terminals. In addition to different interfaces, including graphical user interfaces (GUIs), RM staff must use more than one RM terminal, or log on to more than one RM system with the same RM terminal. The RM systems, employing RM terminals for different tasks such as pre-planned management and real-time dynamic restoration, differ from one another, which forces a user to remember a wide assortment of keystroke commands and multiple meanings for function keys because of inconsistent commands and function key definitions among the RM systems. Often times, the commands and function keys are cryptic and hard to remember. Due to the lack of integration of the RM systems and RM terminals, no universal set of commands are applicable, so additional effort is needed in learning multiple commands for the multiple systems for the same or similar function. As a result, additional training, review and operational time is needed and additional costs are incurred to use the many interfaces involved and to perform the multiple log-on tasks or use the multiple RM terminals required with the prior art systems.

SUMMARY OF THE INVENTION

The present invention overcomes the limitations of the prior art, and provides additional benefits by providing a universal graphical interface for monitoring or managing a network. The graphical interface is windows-based and provides control features that greatly reduce any need for keyed commands, while greatly increasing ease in learning and using the systems involved. A consistent graphical user interface over all systems involved provides additional benefits, such as removing the requirement for multiple commands to perform similar functions. The present invention thus reduces the amount of time required to learn and perform the same monitoring or management tasks.

The present invention is directed to a graphical user interface system for integrated monitoring or management of network devices or resources in a network. An aspect of the invention is in a telecommunications network having telecommunications network devices where each telecommunications network device has a device-specific communication format for communications via the telecommunications network. A telecommunications network monitoring or management system has a processor configured to execute telecommunications monitoring or management processes and an internal communications process. The processor is configured to access the telecommunications network and data networks for process communications. Device interface processes are configured to execute on the processor. Each device interface process is configured to communicate with one of the telecommunications network devices and with a graphical server process of the telecommunications network monitoring or management processes. The device interface processes are configured to translate communications between a communications format of the graphical server process and a device-specific communications format of one of the telecommunications network devices. The graphical server process is configured to communicate with the telecommunications network devices via the device interface processes and other of the telecommunications network monitoring or management processes. Graphical interface processes are configured to communicate with a graphical server process and with user terminals via a data network wherein communications are exchanged between the user terminals and the telecommunications network monitoring or management processes and between the user terminals and the telecommunications network devices.

In accordance with a further aspect of the invention, the telecommunications network monitoring or management processes comprise telecommunications network analysis, restoration, or maintenance processes. The communications exchanged between the user terminals and the telecommunications monitoring or management processes and between the user terminals and the telecommunications devices include data and commands. The communications exchanged between the user terminals and the telecommunications network monitoring or management processes and between the user terminals and the telecommunications devices include audit commands, and in response to the audit commands, status information on the telecommunications network, including telecommunications network link status and the network device status.

In accordance with another aspect of the invention, the user terminals are configured to display a graphical user interface with a main window configured to integrate a plurality of windows used in monitoring or managing the telecommunications network. The graphical user interface has control options comprising file, control, restoration, restoral sets, devices, or reports. The graphical user interface is configured to integrate access to all telecommunications network monitoring or management options and status indicators under a main graphical user interface window. The graphical user interface has graphical objects indicating status of the telecommunications network.

DETAILED DESCRIPTION OF THE INVENTION

A system interface, and in particular, an apparatus and corresponding method for a graphical user interface (GUI) system for monitoring and managing network devices and resources in a network is described in detail below. In the following description, numerous specific details are provided, such as specific processes, restoration functions, specific component architectures, applications in a telecommunications network, etc., to provide a thorough understanding of embodiments of the invention. One skilled in the relevant art, however, will recognize that the invention can be practiced without one or more of the specific details, or with other processes, architectures, hardware, etc. In other instances, well known structures or operations are not shown or described in detail to avoid obscuring the description of the embodiments.

"Monitoring and managing" network devices, such as devices in a telecommunications network, typically includes monitoring the network, analyzing network problems, configuring network devices and communication links, managing restoration systems, maintaining the telecommunications network, manually controlling network devices, generating restoration, maintenance, and operational plans, among other network analysis, restoration and particular maintenance and operations functions. The depicted embodiment is described in particular terms related to restoration of a telecommunications system. However, the present invention is not restricted to only restoration systems, but includes all other functions to be performed in a telecommunications monitoring and management environment.

Figure 1:
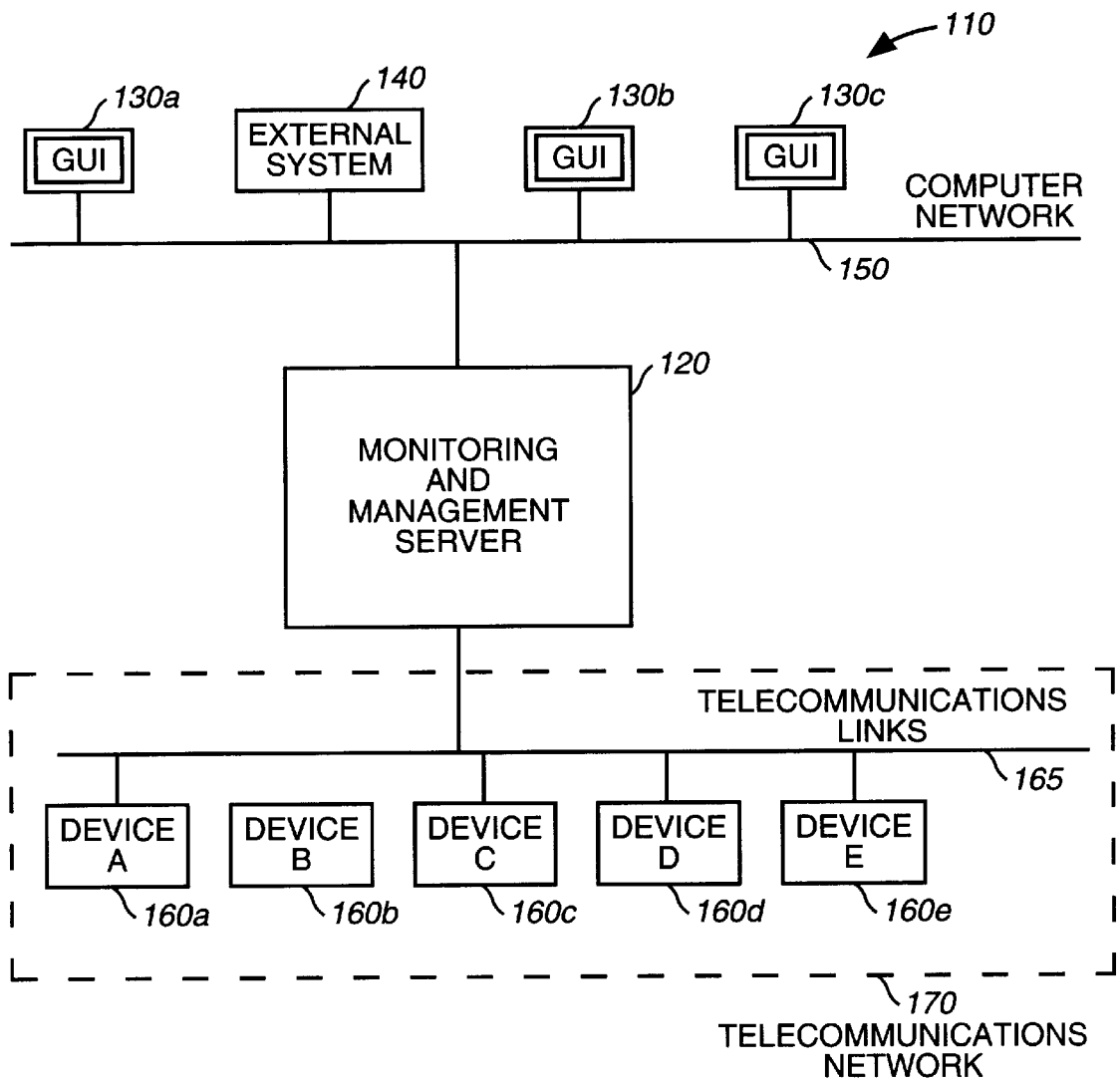
FIG. 1 is a block diagram of a generalized network topology of an embodiment of the present invention.

FIG. 1 shows a network topology, in block diagram format, of a generalized embodiment of the present invention. The block diagram of FIG. 1 shows how operational elements involved are related regarding general network communications. A generalized GUI system 110 includes a Monitoring and Management Server 120 (also referred to generally as a processor) and GUI terminals 130a, 130b and 130c. The GUI terminals 130a, 130b and 130c and external systems 140 communicate with the Monitoring and Management Server 120 over a computer network 150 (also referred to generally as a data network). In the depicted embodiment, the Monitoring and Management Server 120 performs restoration functions and hosts a restoration system referred to as a Real-Time Restoration (RTR) system. A GUI to the RTR system is displayed on the display screens of GUI terminals 130a, 130b and 130c. Typically, a user selects options which are displayed on the GUI of a display screen of a GUI terminal 130. The user selects the options by using a computer input device, such as a trackball, mouse, or other computer input device known in the art. Therefore, the depicted embodiment provides a system and method in which all user options are integrated under a unified, and easy-to-use user interface for monitoring and managing telecommunications networks 170.

In the depicted embodiment, the GUI terminals 130a, 130b and 130c are referred to as Restoration Management (RM) terminals. The RM terminals are typically embodied as workstation terminals such as DEC Alpha workstations and are connected to the Monitoring and Management Server 120 hosted on a DEC Alpha server via DECNet messaging over the computer network 150. The computer network 150 is preferably a local area network (LAN) or wide area network (WAN). The block diagram format of FIG. 1 is not intended to limit the particular network topology to any certain type. For example, the computer network 150 could have a topology of bus, ring, star, or any other type or combination.

The external system 140 represents external systems that are connected to the computer network 150. The number of external systems is not limited to the one external system 140 shown, but can include numerous other external systems. The external systems feed data to the Monitoring and Management Server 120. In the depicted embodiment, the RTR system on the Monitoring and Management Server 120 receives data from external systems via the computer network 150. This data can include topology data and network fault analysis data. The external systems can also collect data from the Monitoring and Management Server 120 such as network alarm data.

The Monitoring and Management Server 120 receives commands from the GUI terminals 130a, 130b and 130c over the computer network 150. In response to these commands, the Monitoring and Management Server 120 sends control signals to telecommunications devices 160a–160e via telecommunications links 165. A telecommunications network 170 includes the telecommunications devices 160*a*–160*e* and the telecommunications links 165. The telecommunications network 170 is not limited by the block diagram format of FIG. 1, but can have a network topology of any sort found in the telecommunications art. Telecommunications devices 160*a*–160*e* are any device found in a telecommunications network. In general, the telecommunications devices and resources have device-specific communication formats for communicating over the telecommunications network. In the depicted embodiment, these devices include restoration devices used for restoration of the telecommunications network 170. An exemplary restoration device is a digital cross-connect (DXC), which switches circuits based on external commands. A DXC 3/3, for example, has ports that support DS-3 trunks and switches traffic among these DS-3 ports. A restoration network typically includes several of these devices as part of the DS-3 transmission network, placed in between network switches. In the depicted embodiment, the telecommunications network 170 uses X.25 protocols with T1 links.

Figure 2:
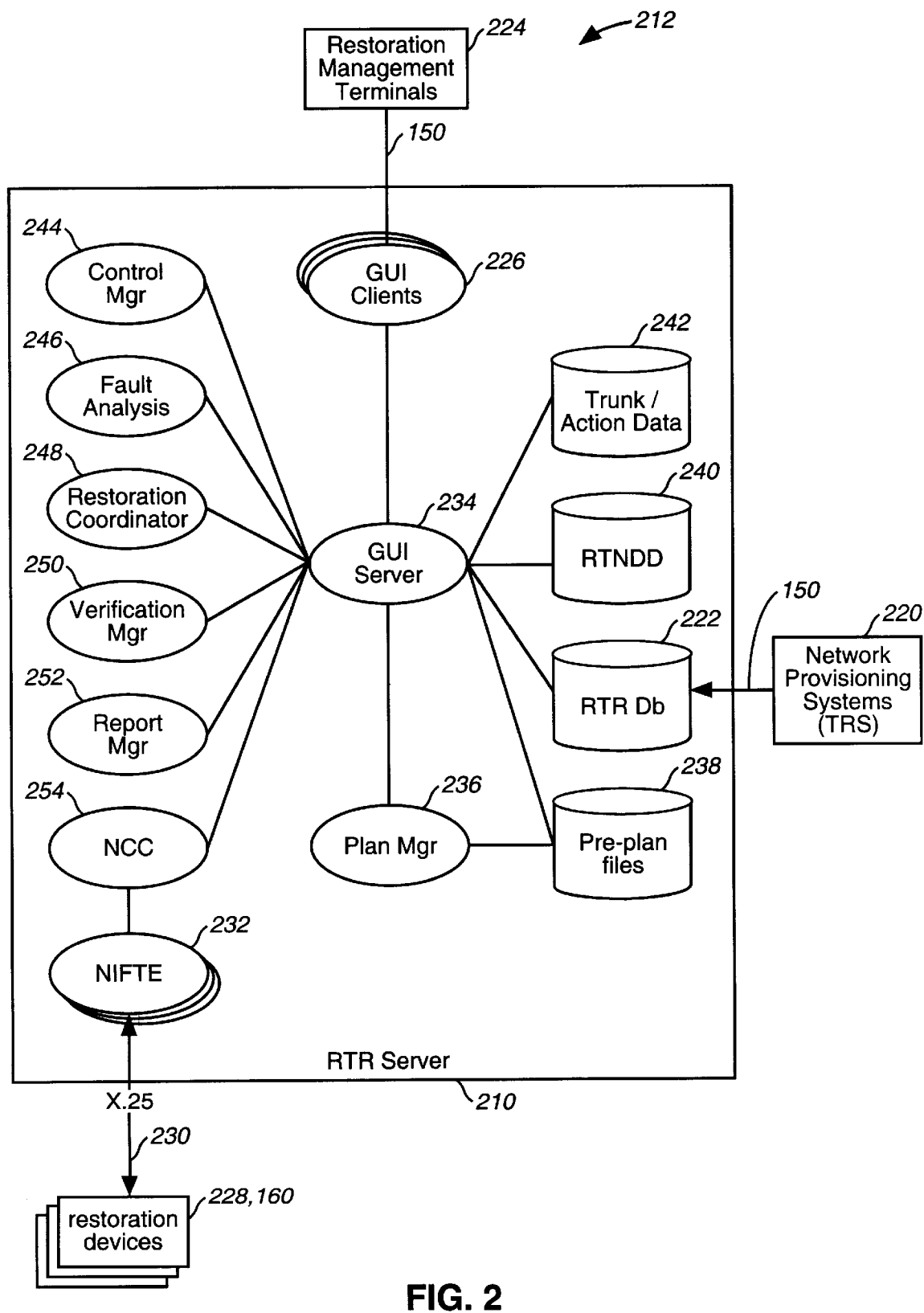
FIG. 2 is a block diagram of details of the depicted embodiment of the present invention of FIG. 1.

FIG. 2 illustrates the internal process architecture of a Monitoring and Management Server 120 hosting the RTR system referred to as an RTR server 210. The GUI System 110 in the depicted embodiment is an RTR GUI System 212 and is described further below. The Network Provisioning Systems are particular systems hosted on one of the external systems 140. In the depicted embodiment, the external system 140 is a Topology Replication Server (TRS) 220. The Network Provisioning Systems on the TRS 200 provides network topology data via computer network 150 to a Real-Time Topology Database 222 hosted on the RTR Server 210. The GUI terminals 130 in the depicted embodiment are restoration management (RM) terminals 224 (also generally referred to as user terminals). The RM terminals 224 communicate via the computer network 150 to one or more GUI Client 226 processes (also known as graphical interface processes) on the RTR Server 210. Communications include sending and receiving data, commands such as audit commands to query status of links and network devices and configure network devices, and unsolicited alarms. In the depicted embodiment, the GUI is an X-Windows application. GUI Clients 226 on the RTR Server 210 transmit GUI windows to an RM terminal 224 over the computer network 150. Preferably, there is one GUI Client 226 for each RM terminal 224. The GUI Clients 226 provide an integrated GUI display to the RM terminals 224. As a result, the depicted embodiment provides a consistent easy-to-use interface for monitoring and managing functions of telecommunication networks 170. The GUI display is described further below. Users, via RM terminals 224, provide respective GUI Clients 226 with commands and data. In the depicted embodiment, the telecommunication devices 160 are network restoration devices 228 and communicate via an X.25 link 230 with Network Interface Front-End (NIFTE) processes 232 (generally known as device interface processes) running on the RTR Server 210 described further below.

As part of the depicted embodiment, a single GUI Server 234 running on the RTR Server 210 provides an interface between all GUI Clients 226 and each process running on the RTR Server 210. Upon receiving user data and commands from an RM terminal 224, a GUI Client 226 sends the data and commands along with user registrations and deregistrations to the GUI Server 234. The GUI Server 234 performs most of the intelligent processing to enable GUI functions. In addition, the GUI Clients 226 write event messages to client logs for system diagnostics and send text-based reports to local printers. Like all RTR processes, the GUI Clients 226 and GUI Server 234 read in system logicals at start-up to initialize run-time parameters. System logicals include an Execution State, a Readiness Mode and other modes of the RTR Server 210. The RTR Server 210 also hosts other processes related to restoration. The RTR GUI System 212 in the depicted embodiment comprises a single GUI Server process 234 on the RTR Server 210, one or more GUI Client Processes 226 on the RTR Server 210, one or more RM terminals 224 and various process interfaces between the GUI Server 234 and other processes on the RTR Server 210. The key restoration processes are shown in FIG. 2 and are described as follows.

Although the depicted embodiment uses one RTR Server 210 to host all the processes, this does not limit the invention. In another embodiment, more than one RTR Server 210 shares the processing load so that the processes are distributed among more than one RTR Server 210. Also, in the depicted embodiment of the present invention, duplicate RTR Servers 210 are used as backup devices to the operational RTR Server 210. Distributing processing load among more than one server and using duplicate servers as backup devices are well known in the art.

A Plan Manager process 236 and Pre-Plan Files Database 238 allow users of the RTR Server 210 to perform pre-planned network restoration in addition to real-time restoration. Restoration pre-plans are stored in the Pre-Plan Files Database 238. The Plan Manager process 236 is responsible for generating, maintaining, and retrieving pre-plans for implementation.

A RTR Database 222 includes all network topology for the external Network Provisioning Systems, hosted on the TRS 220. The RTR Database 222 is populated with periodic data feeds from external systems, including all topology data. These data are then filtered to populate a Real-Time Network Device Database (RTNDD) 240.

The RTNDD 240 is implemented in global shared memory of the RTR Server 210. The RTNDD 240 provides real-time data on the current configuration and topology of the restoration network. The RTNDD 240 includes a memory-resident database accessible to processes hosted by the RTR Server 210 (RTR processes) for data reading and is accessible to some RTR processes for real-time data updates. The RTNDD 240 is further described in the current assignee's U.S. patent application Ser. No. 08/777,464, "System for Real-Time Device Data Management," filed Dec. 31, 1996. A Trunk/Action Database 242 stores log files for actions that have been dispatched and trunks that are impacted by an outage. An Action Log in the Trunk/Action Database 242 includes actions that have been dispatched to restoration devices along with the results of each action. Actions are typically cross-connect or disconnect commands. The GUI Server 234 reads the Action Log and transmits the actions to be displayed on the GUI of the RM terminals 224 via the GUI clients 226. A Trunk Log includes trunks that have been identified as impacted by an outage. The GUI Server 234 reads the Trunk Log and sends this information via the GUI clients 236 to the RM terminals 224 to be displayed on the GUIs of the RM terminals 224.

A Control Manager process 244 serves as an interface to external systems. The Control Manager 244 receives commands from the external systems, distributes these commands to the appropriate internal processes, and ensures responses are returned when needed. It also maintains system logicals, which are run-time parameters of the RTR Server 210. The GUI Server 234 sends all state and mode changes and requests for status to the Control Manager process 244.

A Fault Analysis process 246 reads in alarm data from external systems along with network topology data from the RTNDD 240 and the RTR Database. The Fault Analysis process 246 employs inference engines to analyze these data to detect network outages. When an outage is detected, it sends an outage announcement to the GUI Server 234 and other RTR processes. The Control Manager process 244 changes the status of the processes from normal to alert when it receives an outage announcement from the Fault Analysis process 246.

A Restoration Coordinator process 248 serves as the main interface for all processes having a Restoration Control function. The Restoration Coordinator 248 receives commands from other RTR processes including commands from external systems via the Control Manager 244 and distributes the commands to RTR processes having a Restoration Control function. Distribution of commands to other processes often requires a specific timing and sequence which the Restoration Coordinator process 248 controls. The Restoration Control process 248 includes other processes that perform real-time restoration. These processes are a Break Isolator, a Dynamic Route Generator, and an Action Dispatcher process. The Break Isolator process is further disclosed in the current assignee's U.S. patent application Ser. No. 08/903,666, "Break Isolator," filed Jul. 31, 1997, the Dynamic Route Generator process is further disclosed in the current assignee's U.S. patent application Ser. No. 08/904,095, "Dynamic Route Generator," filed Jul. 31, 1997, and the Action Dispatcher is further disclosed in the current assignee's U.S. patent application Ser. No. 08/903,611, "Action Dispatcher," filed Jul. 31, 1997.

As explained more fully below, the RTR GUI System 212 enables a user to control many restoration functions by the user interacting with a single GUI. The GUI may have different display windows displayed on the display screen of the RM terminal 224, but all the display windows are integrated under a common main display window. Importantly, the display windows are also controlled similarly to allow for ease of operation. The restoration functions include sending manual restoration commands to restoration devices 228. The GUI Server 234 sends all the restoration commands to the Restoration Coordinator process 248 and receives back confirmations. The confirmations are used to display status to the user on the GUI displayed on the display screens of the RM terminals 224 via the GUI Clients 226 and the computer network 150.

A Verification Manager process 250 performs routines to verify the current topology of the restoration network and to update the network topology data in the RTNDD 240. The Verification Manager process 250 generally requires no human intervention. However, the GUI system 110 does provide a control interface to the Verification Manager process 250 so that users can initiate an audit of spare capacity in the restoration network. The Verification Manager process 250 is further described in the current assignee's U.S. patent application Ser. No. 08/903,609, "Remote Spares Verification," filed Jul. 31, 1997.

A Report Manager process 252 processes various data from the RTNDD 240, RTR Database 222, and RTR Server 210 system logs to provide reports on restoration operations. The GUI System 110 provides an integrated GUI displayed on the RM terminals 224 to access the Report Manager process 252. A user can then request reports and view reports on-line by using a GUI on an RM terminal 234.

A Network Control Coordinator (NCC) process 254 and Network Interface Front-End (NIFTE) processes 232 provide necessary interfaces between the GUI Server 234, with its particular communication format, and the restoration devices 228 with their device-specific communication formats. An individual NIFTE process 232 provides communications and control interfaces for each restoration device 228 to the RTR Server 210. There is one NIFTE process 232 for each restoration device 228. The NIFTE process 232 is further disclosed in the current assignee's U.S. patent application Ser. No. 08/824,648, "Interface for Interfacing Client Programs with Network Devices in a Telecommunications Network," filed Mar. 24, 1997. The GUI server 234 interfaces with the NCC process 254, where the NCC process 254 distributes GUI messages to the appropriate NIFTE process 232.

Figure 3:
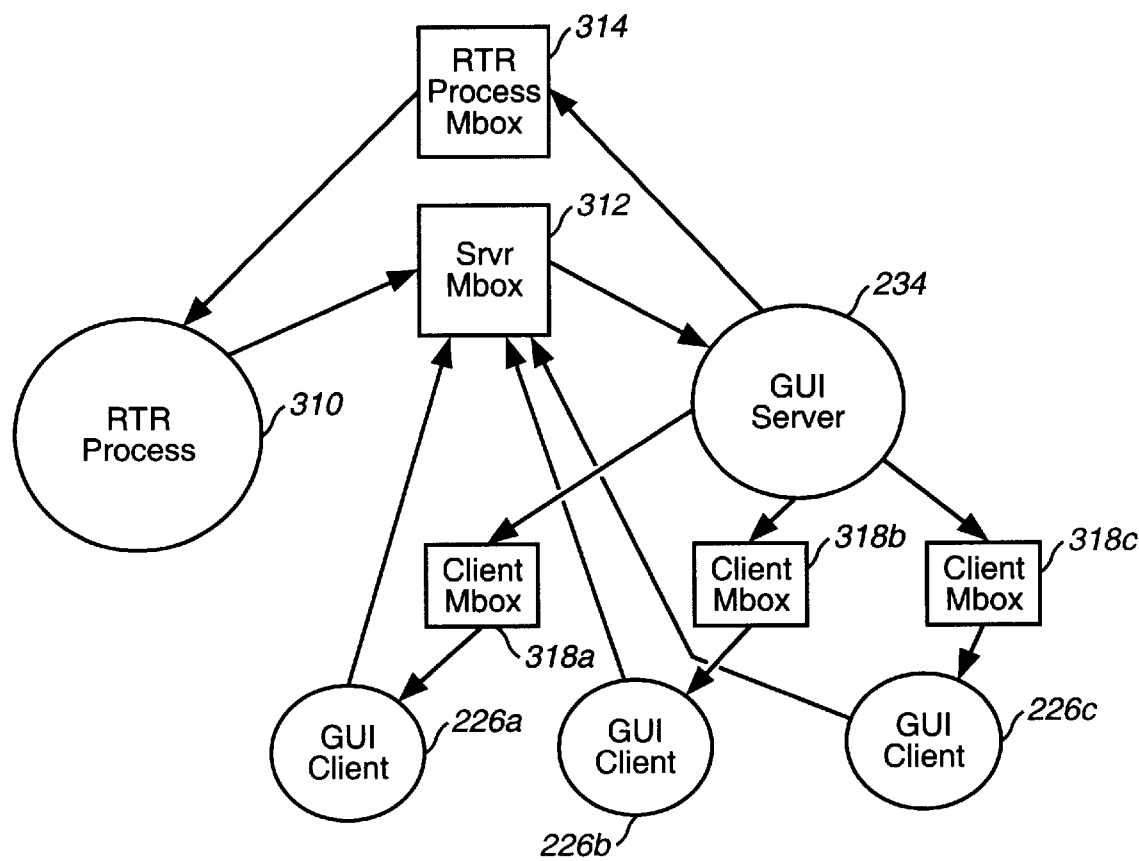
FIG. 3 is a block diagram of the internal communications process of the server of FIG. 2.

Processes on the RTR Server 210 can communicate with each other via an internal communication process. In the depicted embodiment, the internal communication process uses messages passed among internal mailboxes. As shown in FIG. 3, RTR process 310 passes messages to other processes such as the GUI server 234 via a Server Mailbox 312. In turn, the GUI Server 234 passes messages to the RTR process 310 via an RTR Process mailbox 314. Messages are sent from the GUI Server 234 to GUI Client Processes 226a, 226b and 226c via Client Mailboxes 318a, 318b, and 318c, respectively. The GUI clients 226a, 226b, and 226c can send messages to the GUI Server 234 via the Server Mailbox 312. The GUI Server 210 either broadcasts messages to all GUI Clients 226 currently registered or to individual GUI clients 226. The RTR Processes send messages to the GUI Server 234, which then broadcasts the message to all GUI Clients currently registered and listed on a broadcast list in the GUI Server 234. When a GUI Client 226 has an update notification, the notification is sent to the GUI Server and the GUI Server 234 will broadcast the update to each of the other GUI Clients or to an RTR process depending on the destination of the update. As a result, each GUI Client process 226 only needs to have the mailbox address of the GUI Server process 234 and be registered with the GUI Server process 234.

When a GUI Client 226 process is initiated, it registers with the GUI Server 234 via the GUI Server mailbox 312. The GUI Client 226 passes a return address of the GUI Client mailbox 318 to the GUI Server 234 as part of the registration message. The GUI Server 234 then connects to the GUI client mailbox 318 which allows the GUI client 226 to receive broadcast messages from the GUI Server 234. If a user of a GUI Client 226 requests to exit a GUI client 226, the GUI Client 226 sends a deregistration message to the GUI Server 234 to be removed from the broadcast list of the GUI Server 234. In the rare event of an abnormal termination of an GUI's Client, the GUI Server 234 sends out a periodic hello message to each GUI Client 226. If the GUI Client 226 does not answer within a specified time or number of hello messages, the GUI Server 234 will automatically remove the GUI Client 226 from the broadcast list. In a similar manner, if a GUI Client 226 does not receive a hello message from the GUI Server 234 within a specified time, then the GUI Client 226 will re-register with the GUI Server 234.

Figure 4:
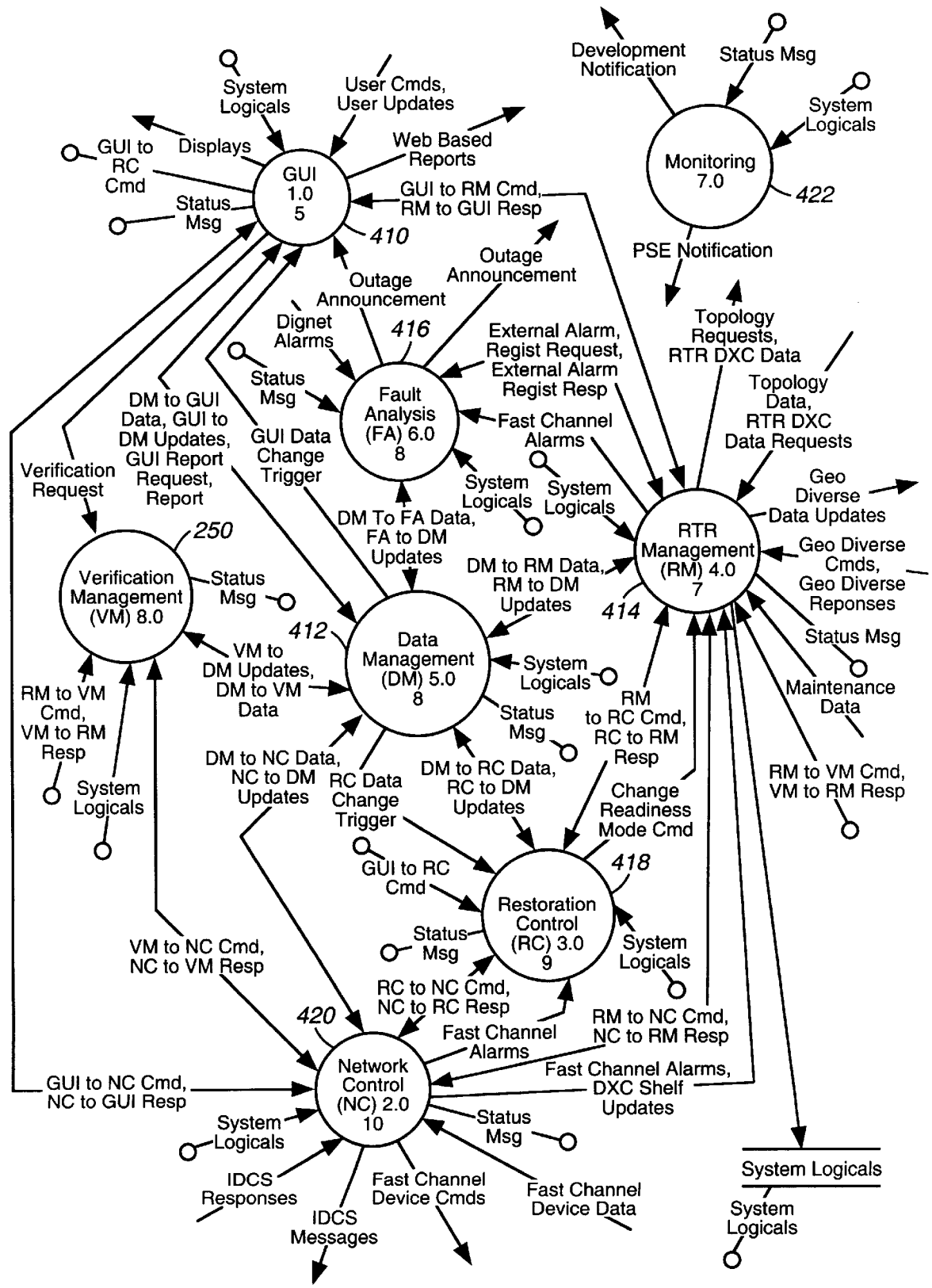
FIG. 4 is a block diagram showing data flows of components of the server of FIG. 2.
Figure 5:
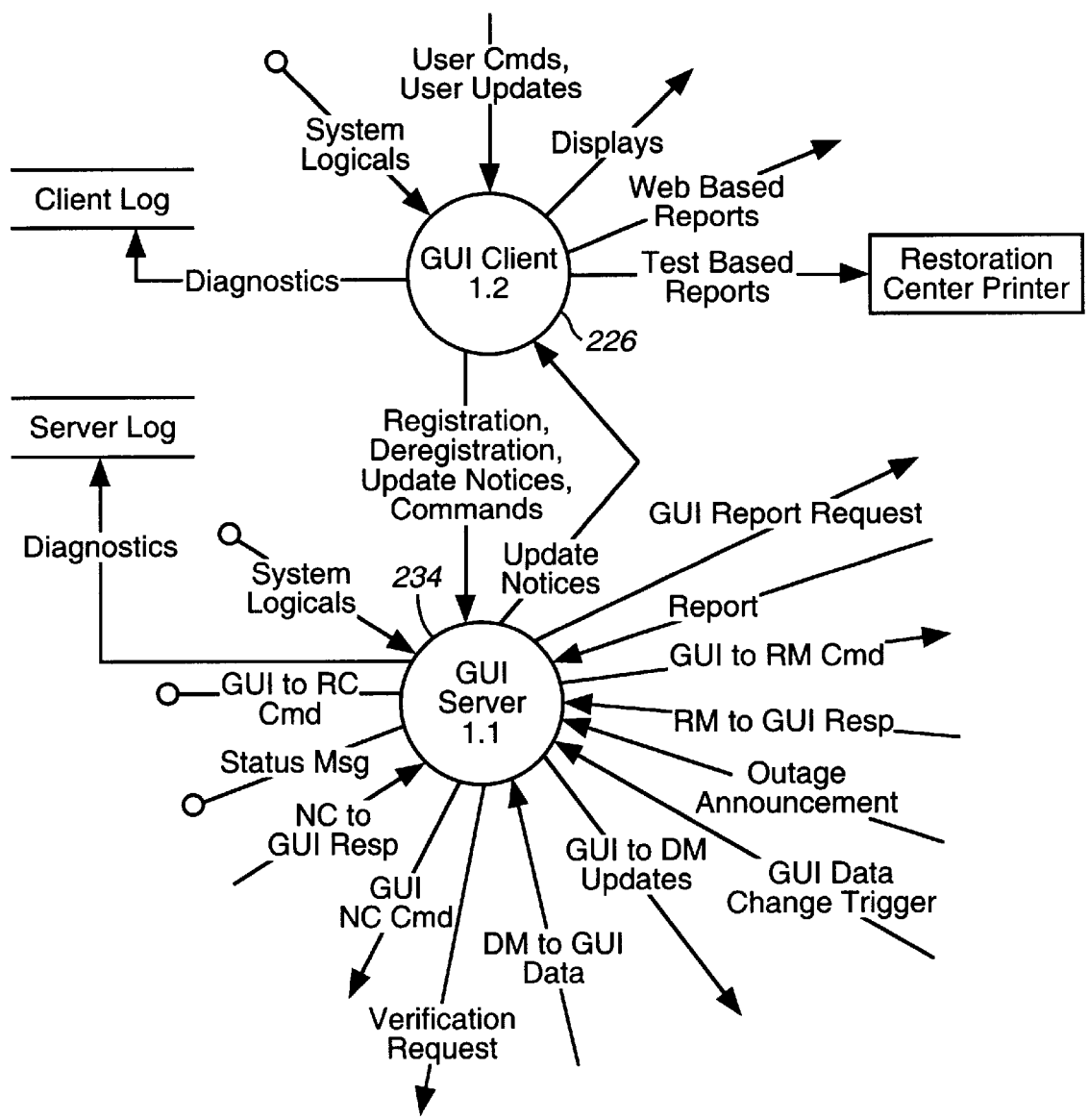
FIG. 5 is a block diagram showing data flows of processes of a GUI component of FIG. 4.

FIG. 4 shows a data flow diagram for the processes on the RTR Server 210. For ease of illustration, some processes are grouped into higher level components. For instance, the GUI Server process 234 and GUI Client processes 226 are grouped into GUI component 410. The GUI component 410 is shown at a more detailed level in FIG. 5 where both external and internal data flows are depicted.

FIG. 4, and the data flow diagrams of FIGS. 5 through 10, are generally self-explanatory to those skilled in the relevant art. These data flow diagrams identify various data types and the appropriate routing to or from other processes for such data, as shown in FIGS. 4 through 10. To avoid obscuring other important aspects of the invention, only summary descriptions of such Figures are provided herein. For more thorough understanding, those skilled in the relevant art are directed to the Figures themselves, and to the various co-pending applications noted herein.

Figure 6:
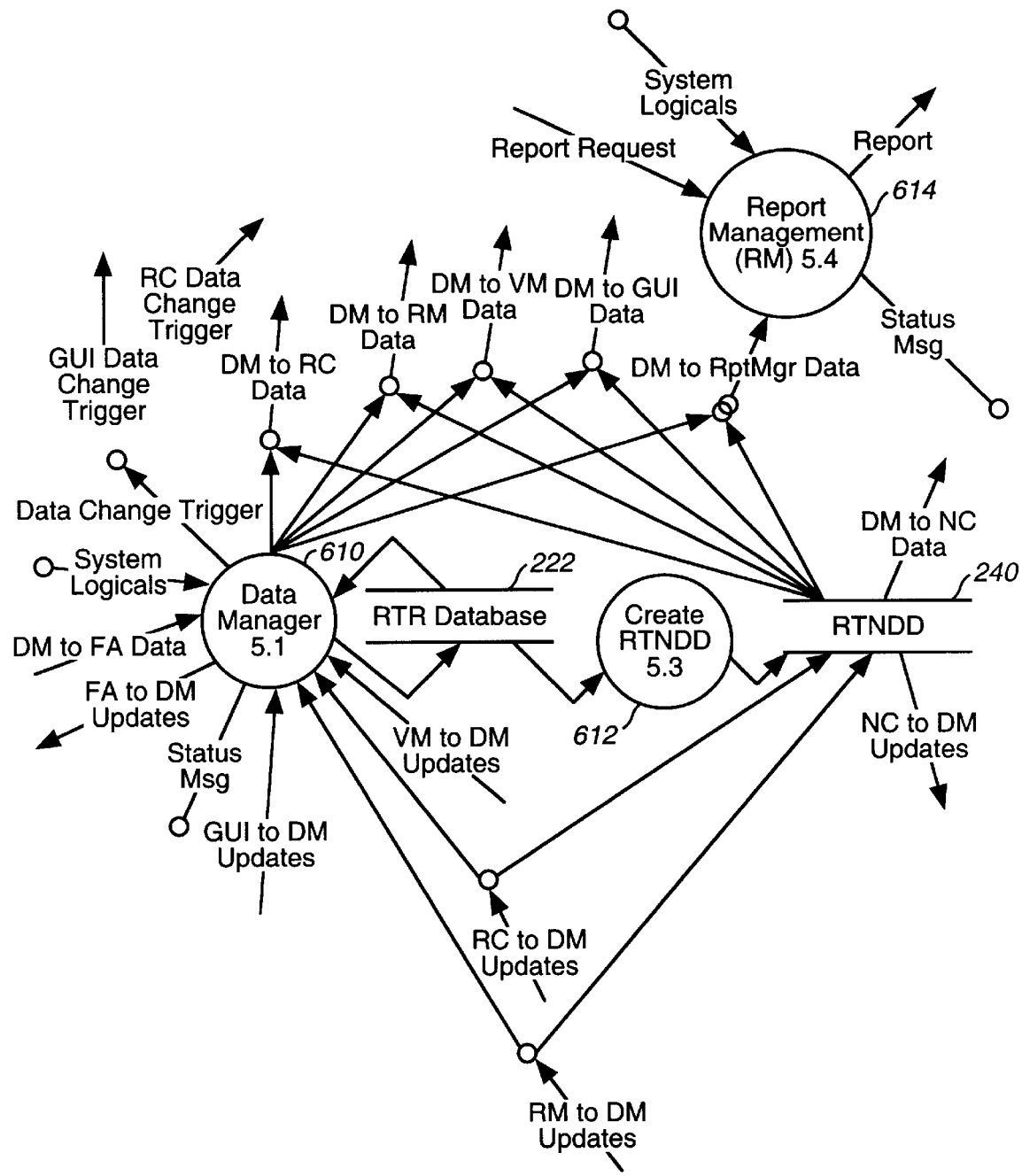
FIG. 6 is a block diagram showing data flows of processes of a Data Management component of FIG. 4.

A Data Management component 412 of FIG. 4 includes the RTR Database 222 and the RTNDD 240 processes of the RTR Server 210 shown in FIG. 2. The Data Management component 412 also includes a Data Manager process 610, a Create RTNDD process 612, and a Report Management process 614 as shown in FIG. 6. The Report Management process 614 includes the Report Manager process 252 shown in FIG. 2.

Figure 7:
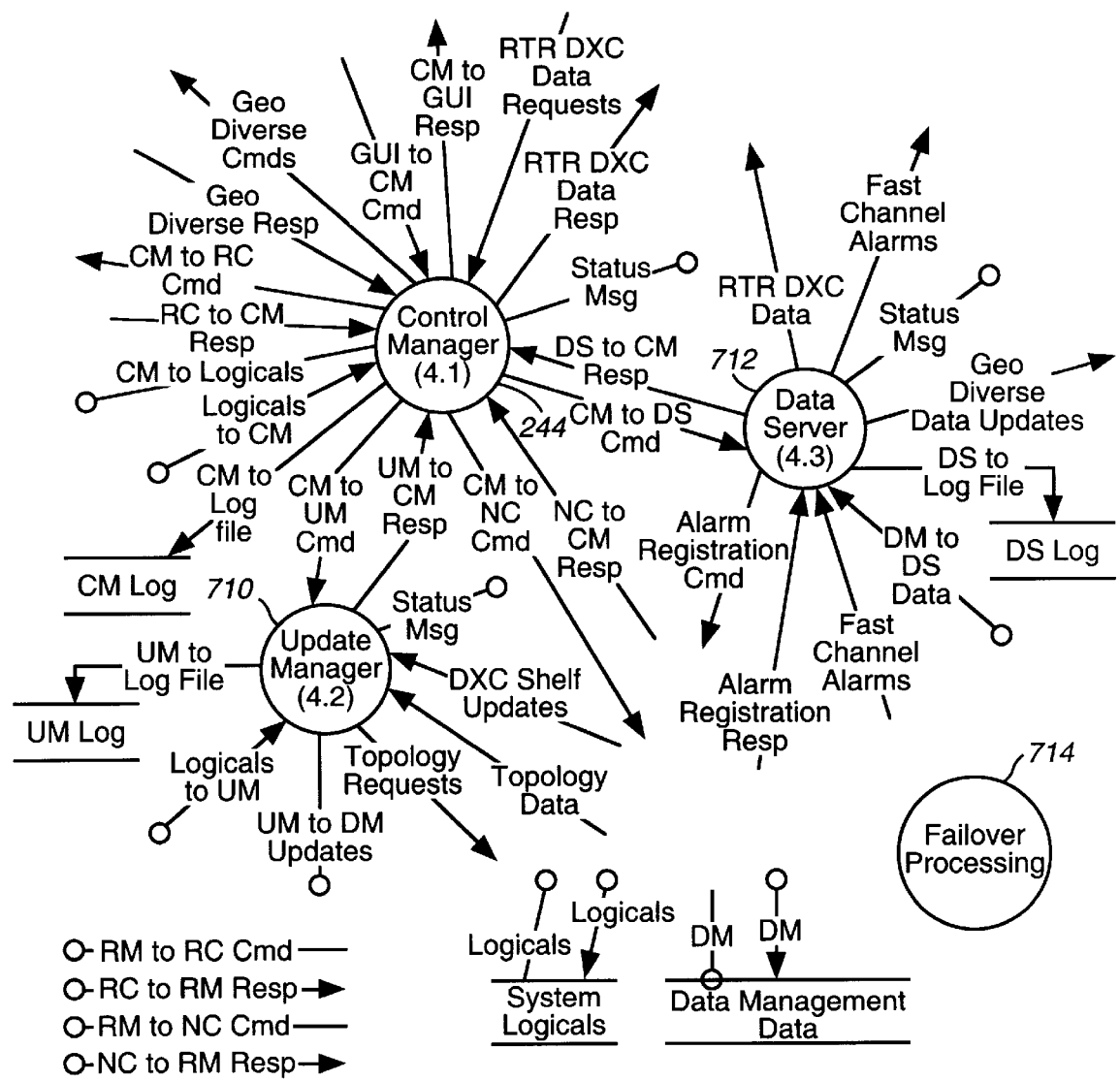
FIG. 7 is a block diagram showing data flows of processes of a RTR Management component of FIG. 4.

A RTR Management component 414 of FIG. 4 includes the Control Manager process 244 of the RTR Server process 210 shown in FIG. 2. The RTR Management component 414 also includes an Update Manager process 710, a Data Server process 712 and a Fail-Over Processing process 714, as shown in FIG. 7.

Figure 8:
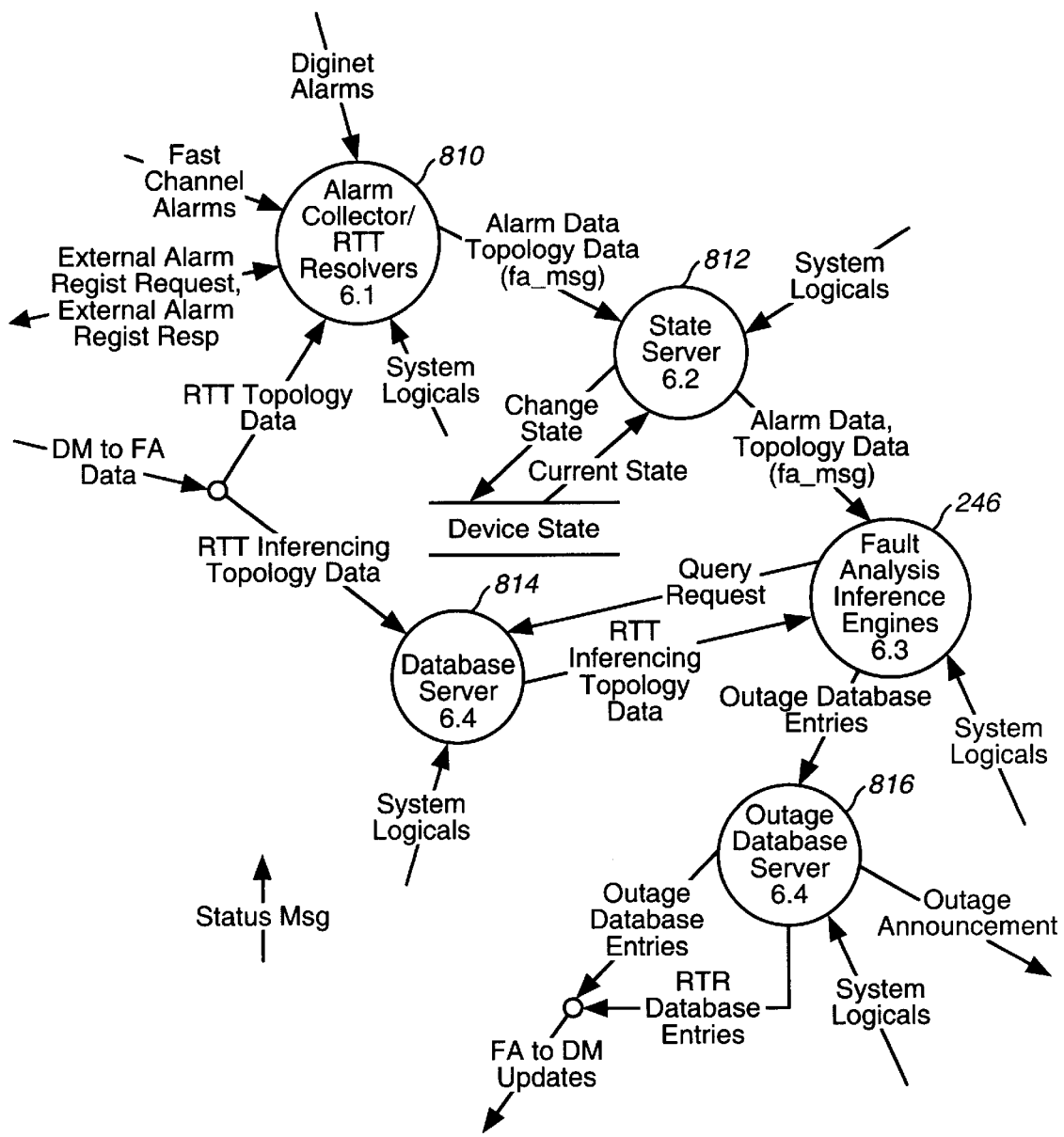
FIG. 8 is a block diagram showing data flows of processes of a Fault Analysis component of FIG. 4.

A Fault Analysis component 416 of FIG. 4 includes the Fault Analysis process 246 of the RTR Server of FIG. 2. The Fault Analysis component 416 also includes an Alarm Collector process 810, a State Server process 812, a Database Server process 814, and an Outage Database Server process 816, as shown in FIG. 8.

Figure 9:
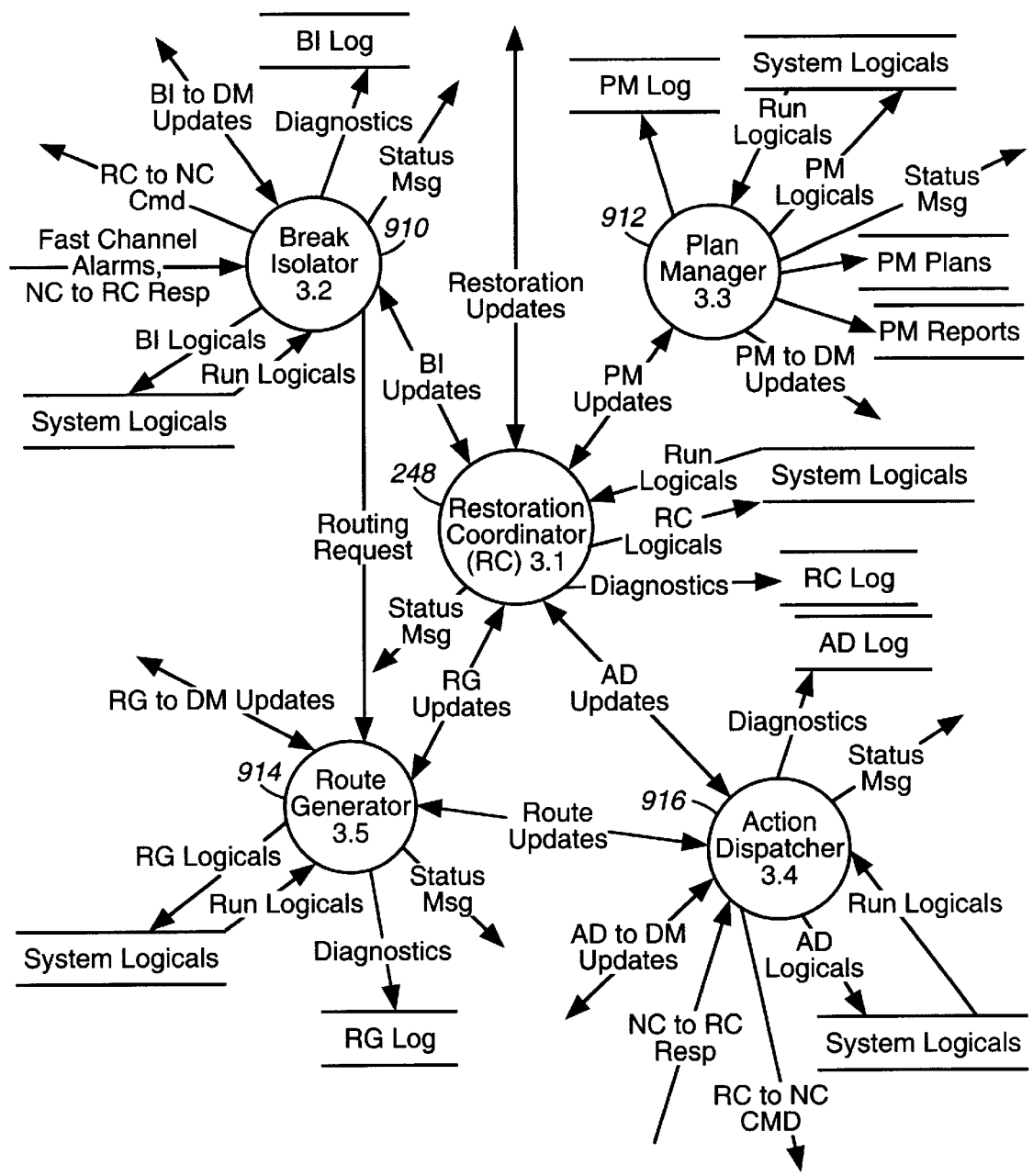
FIG. 9 is a block diagram showing data flows of processes of a Restoration Control component of FIG. 4.

A Restoration Control component 418 of FIG. 4 includes the Restoration Coordinator process 248 of the RTR Server 210 of FIG. 2. The Restoration Control component 418 of FIG. 4 also includes a Break Isolator process 910, a Plan Manager process 912, a Route Generator process 914 and an Action Dispatcher process 916 as shown in FIG. 9.

Figure 10:
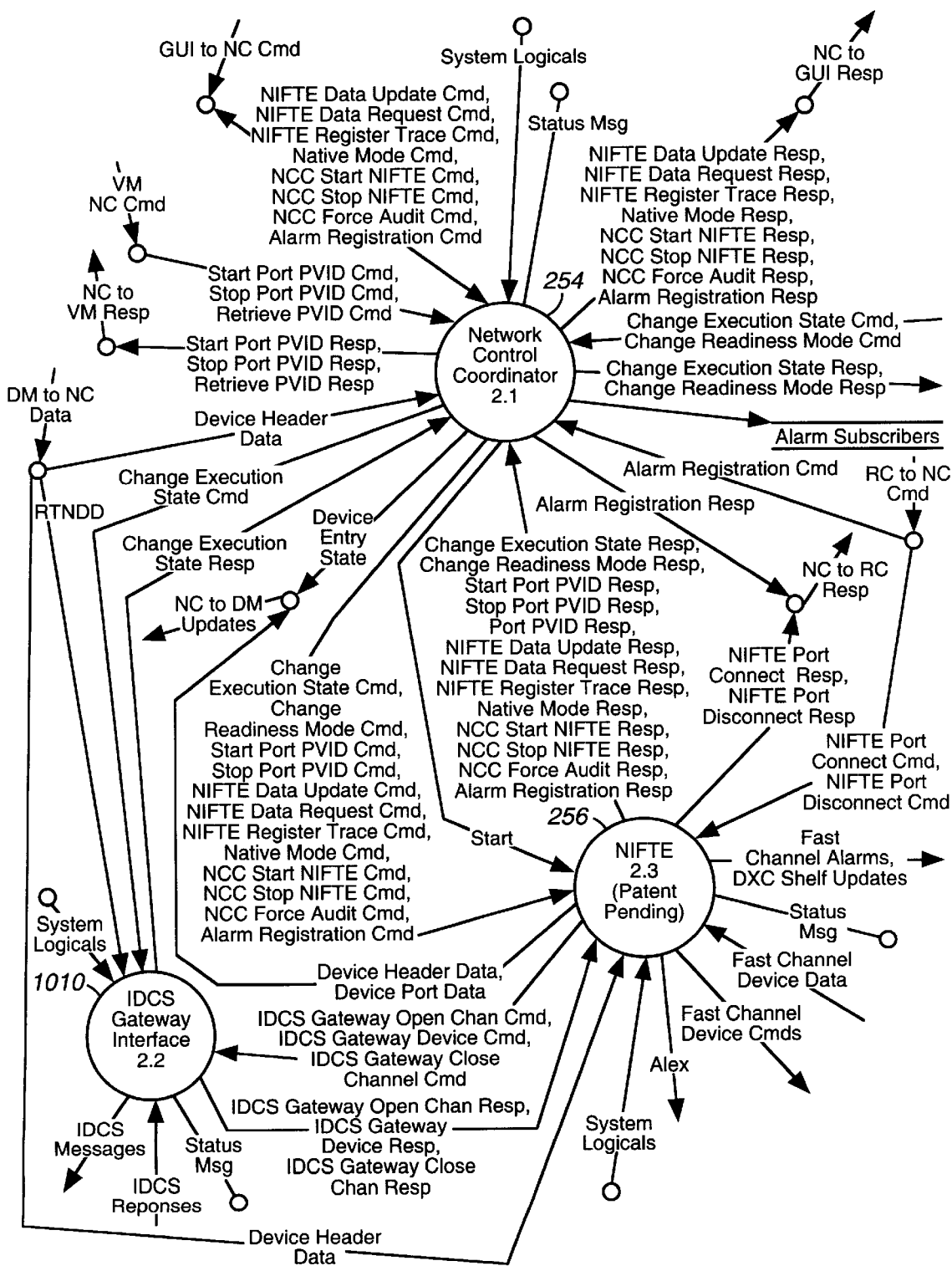
FIG. 10 is a block diagram showing data flows of processes of a Network Control component of FIG. 4.

A Network Control component 420 of FIG. 4 includes the NCC process 254 and the NIFTE process 256 of the RTR Server 210 of FIG. 2. The Network Control component 420 also includes an Interactive Device Control System (IDCS) Gateway Interface process 1010 as shown in FIG. 10. The Verification Management process 250 is shown along with a monitoring process 422 in FIG. 4.

The RTR GUI system 212 allows a user at the RM Terminal 224 to manage and monitor restoration of a telecommunications network in a manner that is easy to learn and perform compared to prior art systems. The following functions are included in the management and monitoring processes of restoration.

The RTR GUI system 212 allows a user to configure the RTR Server 210 interfaces and links with restoration devices 228. A user can configure the parameters of the RTR Server's interfaces with each restoration device 228. These include the parameters that the NIFTE processes 232 read at start-up as well as run-time parameters. The parameters include, but are not limited to, link status, link auditing intervals, and message bundling, which are well known in the art. A user can designate one telecommunications channel as primary and another telecommunications channel as back up. Each X.25 link comprises four channels. Each channel handles either audit commands, connect/disconnect commands, administration commands, or unsolicited alarms. These channels can be configured through the RTR GUI system 212 by a user stationed at an RM terminal 224.

With the RTR GUI system 212 a user can configure X.25 switches to add, delete, or modify addresses for restoration devices. A user can also change X.25 packet routing and re-home devices to other sites having additional RTR Servers 210 or switches.

With the RTR GUI system 212 a user stationed at the RM Terminal 234 can turn X.25 links to a restoration device 228 on or off. For example, a user can take one or both X.25 links out of service for maintenance. This would cause the RTR Server 210 to use back-up communications.

With the RTR GUI system 212 a user can control the restoration devices 228 manually during a restoration process. A user can also reroute traffic from a telecommunications device in order to perform maintenance activities. This can be either done in real-time with direct interaction with the devices in an RTR Native Mode, or can be pre-planned.

The RTR GUI system 212 provides real-time displays of the status and health of a traffic-bearing telecommunications network. A user stationed at the RM Terminal 224 can receive alerts regarding any detected outages as well as identification of impacted telecommunications trunks. The RTR GUI system 212 also enables a user to monitor restoration devices. The monitoring can be done both on a device level, where the device is represented as a single functional component, and on the port level, where each port of a device is monitored. By monitoring ports, a user can effectively monitor trunks between devices.

The RTR GUI system 212 also enables a user to monitor the X.25 links and switches between a RTR Server 210 and the restoration devices 228. A user can monitor in real-time the status of each link as well as the traffic exchanged between an RTR Server 210 and restoration devices 228. A user can also perform audits on restoration devices 228 and on X.25 links.

With the RTR GUI system 212 a user can efficiently and effectively manage restoration plans that have specific designated tasks, all with a unified GUI. This can be done for pre-planned restoration and to control the restoration network for maintenance activities. A Restoral Set includes Custom Restoral Sets described further below and Failure Spans. A Failure Span is a segment of the transmission network that can be restored with a single restoral route in a pre-plan. The user can create, delete, or modify Restoral Sets. A user can also create, delete, or modify pre-plans and implement the pre-plans. A user can initiate the pre-plan generation process in general or for certain Restoral Sets in jeopardy. A user can also monitor the status of pre-plans and approved pre-plans that have been generated.

The RTR GUI system 212 also enables a user to efficiently and effectively monitor and manage RTR processes and the overall RTR System by manipulating various parameters, all with a unified GUI. For example, a Dynamic Route Generator (DRG) mode of an RTR System can be enabled or disabled. When enabled, the RTR System operates in a real-time restoration mode. When disabled, the RTR System operates in a pre-plan mode. A user can also manage RTR processes by creating, deleting, or modifying Restoral Sets.

The RTR GUI system 212 enables a user to perform the management and monitoring functions as described above through a single GUI to a single GUI system while stationed at an RM Terminal 224 in the depicted embodiment of the invention. The resulting consistent interface assists the user in controlling and performing the many functions involved without resorting to the cumbersome commands and controls of the prior art systems. The functions themselves are performed by RTR internal processes further described in the current assignee's U.S. patent application Ser. No. 08/905,241, "Overall RTR System," filed Jul. 31, 1997.

Figure 11:
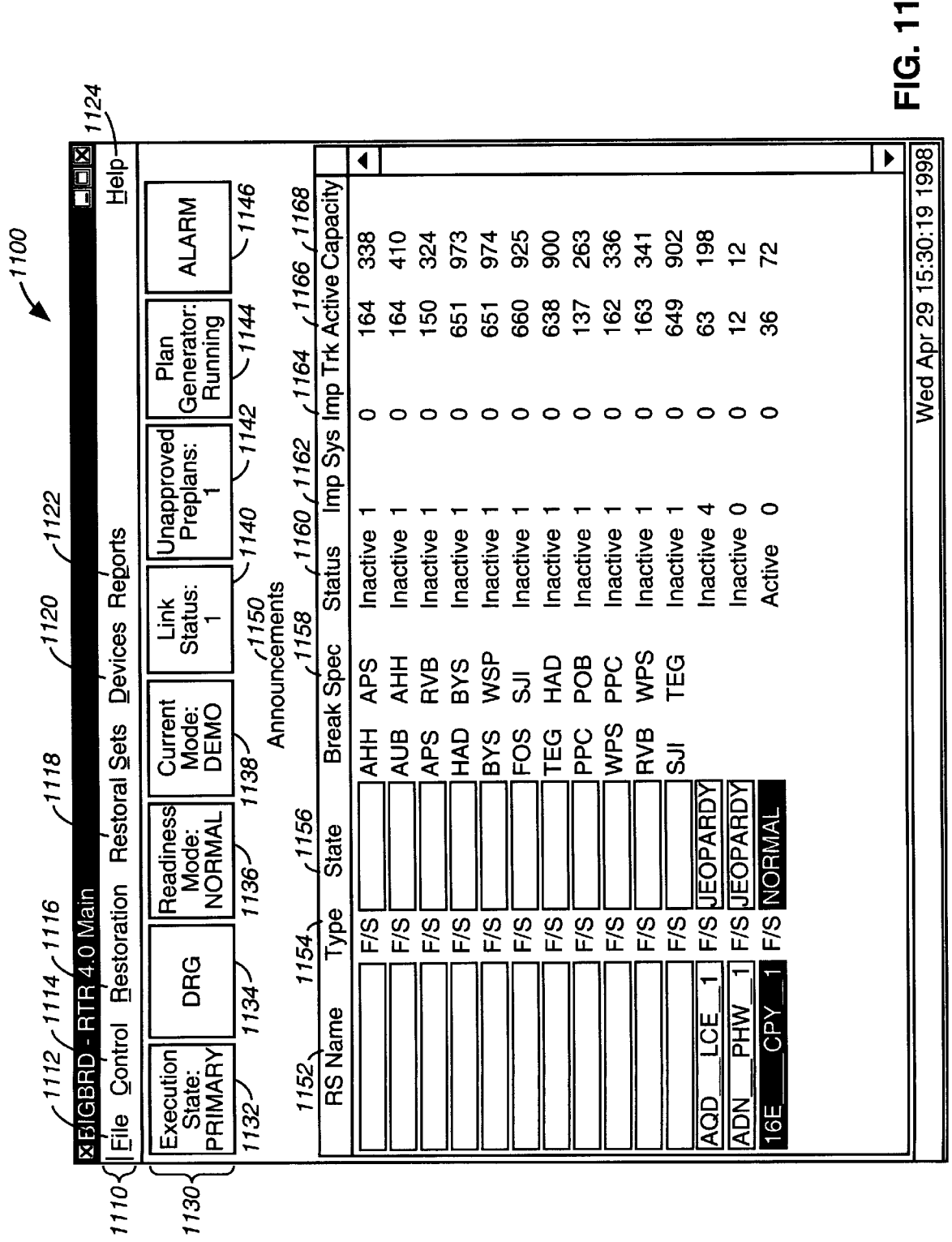
FIG. 11 is a representation of the Main window of the GUI of a depicted embodiment shown in FIG. 2.

As shown in FIG. 11, a Main window 1100 of the GUI, as displayed on the display screen of an RM terminal 224, comprises a series of pull-down menus 1110, a series of status buttons 1130, and an Announcements section 1150. The pull-down menus 1110 include File 1112, Control 1114, Restoration 1116, Restoral Sets 1118, Devices 1120, Reports 1122, and Help 1124. The series of status buttons 1130 include Execution State 1132, DRG State 1134, Readiness Mode 1136, Current Mode 1138, Link Status 1140, Unapproved Pre-Plans 1142, Plan Generator 1144, and Alarm 1146.

Figure 12:
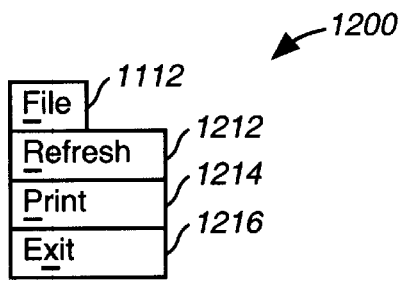
FIG. 12 shows a File pull-down menu of a File menu selection of FIG. 11.

The pull-down menus 1110 provide users with easy access to most of the RTR system functions. From the main GUI window 1100 a user can select a "File" option 1112. Selecting the "File" option 1112 allows the user to access the File menu 1200 as shown in FIG. 12. The first option of the File menu 1200 is a "Refresh" option 1212. The "Refresh" option 1212 forces an update to a list displayed in the Main GUI window 1100. A "Print" option 1214, when selected, causes the currently displayed announcements in the Announcements section 1150 of the Main GUI window 1100 to be printed. An "Exit" option 1216, when selected, causes the RM terminal 224 running the particular Main GUI window 1100 to cease communications with the GUI Client process 226 serving the particular RM terminal 224 and to exit the GUI program executing on the RM terminal 224.

Figure 13:
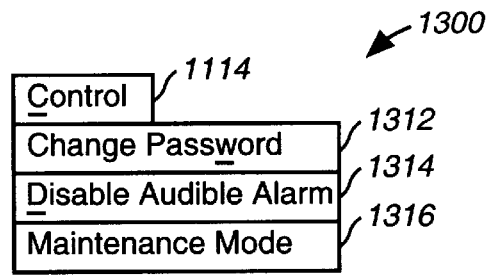
FIG. 13 shows a Control pull-down menu of a Control menu selection of FIG. 11.

A "Control" option 114 of the Main GUI window 1100, when selected, allows a user to access the Control menu 1300 as shown in FIG. 13. A "Change Password" option 1312, when selected, allows a user to change a password used to access various RTR system functions. A "Disable I/O" option 1314, when selected, allows a user to mute an audible alarm signal. A "Maintenance Mode" option 1316, when selected, allows a user to access maintenance functions. These maintenance functions are added to other restoration functions. Once added, the maintenance functions stay enabled until the user exits from the RTR System by selecting the "Exit" option 1216.

Figure 14:
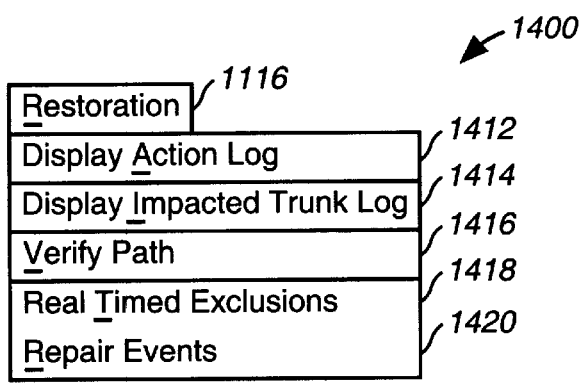
FIG. 14 shows a Restoration pull-down menu of a Restoration menu selection of FIG. 11.

A "Restoration" option 1116 of the Main GUI window 1100 of FIG. 11, when selected, allows a user to access the Restoration menu 1400 as shown in FIG. 14. A "Display Action Log" option 1412, when selected, displays a log which shows successful and unsuccessful disconnect and connect commands sent to restoration devices 228. A "Display Impacted Trunk Log" option 1414, when selected, allows a user to display a log comprising information regarding trunk lines impacted by problems with the telecommunications network 170. A "Verify Path" option 1416, when selected, allows a user to verify traffic on any specified route, not just a trunk of a restoration set/path. A "Real Time Exclusions" option 1418, when selected, allows a user to input trunk start and end points of trunks to be excluded from a restoration task. The Dynamic Route Generator referenced above does not generate routes using any trunks input from the Real Time Exclusions option 1418. A "Repair Events" option 1420, when selected, allows a user to track the status of repair events. This option allows a user to enter a time stamp and a comment detailing the repair event. The user can enter a time stamp and a comment detailing the repair event. After the repair event is completed the user can delete the event.

Figure 15:
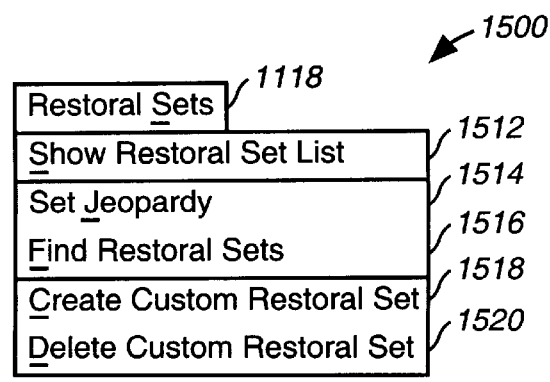
FIG. 15 shows a Restoral Sets pull-down menu of a Restoral Sets menu selection of FIG. 11.

A "Restoral Sets" option 1118 of the Main GUI window 1100 of FIG. 11, when selected, allows a user to access the Restoral menu 1500 as shown in FIG. 15. Restoral Sets and Failure Spans are further disclosed in the current assignee's patent application Ser. No. 08/758,111, "Method and Apparatus for Determining Maximum Network Failure Spans for Restoration," filed Nov. 26, 1996; patent application Ser. No. 08/753,559, "Method and Apparatus for Isolating Network Failures by Applying Alarms to Failure Spans," filed Nov. 26, 1996; patent application Ser. No. 08/753,553, "Method and Apparatus for Identifying Restoral Routes in a Network," filed Nov. 26, 1996; and patent application Ser. No. 08/753,560, "Method and Apparatus for Isolating Network Failures by Correlating Paths Issuing Alarms with Failure Spans," issued filed Nov. 26, 1996. A "Show Restoral Set List" option 1512, when selected, allows a user to view a list of a Restoral Sets in a lower portion of the Main GUI window 1100. A "Set Jeopardy" option 1514, when selected, allows a user to identify a problem in the network, and then search for and identify restoral sets to isolate areas for monitoring. A "Find Restoral Sets" option 1516, when selected, allows a user to search for restoral sets based on specific identification. A "Create Custom Restoral Set" option 1518, when selected, allows a user to add specified systems and trunks to a new restoral set. A user can either create a Custom Restoral Set through a pre-population option or a copy option. The pre-population option allows a user to specify portions of a telecommunications network to be included in a Custom Restoral Set by either specifying telecommunications nodes on stations, or by identifying equipment specifications of telecommunications network devices 228. Telecommunications devices and trunks that are associated with the specified items are included in the Custom Restoral Set. For instance, if two telecommunications stations are specified, the Custom Restoral Set also includes any trunks that extend between the two stations. The copy option allows a user to copy portions of Failure Spans such as trunks or telecommunications network devices to be included in a Custom Restoral Set. A "Delete Custom Restoral Set" option 1520, when selected, allows a user to delete a Custom Restoral Set from the system.

Figure 16:
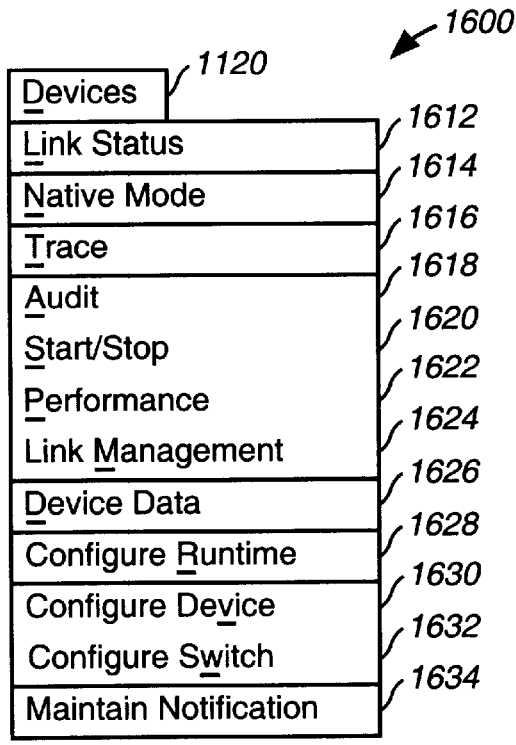
FIG. 16 shows a Devices pull-down menu of a Devices menu selection of FIG. 11.

The "Devices" option 1120 of the Main GUI window 1100 of FIG. 11, when selected, allows a user to access the Device menu 1600 as shown in FIG. 16. The Device menu allows a user to select various maintenance functions, including configuration control of the NIFTE processes 232 and the X.25 links and switches. Execution of these maintenance functions causes the GUI Server process 234 to send commands to the NCC process 254 represented by a "GUI to NC Cmd" data flow shown in FIG. 4. Updates made by a GUI Server process 234 are sent to the RTNDD process 240 as represented by "GUI Data Change Trigger to Data Management" data flow shown in FIG. 4. A Link Status option 1612, when selected, opens a window that shows real-time status of all network DXC links.

A "Native Mode" option 1614, when selected, allows a user to interact directly with a restoration device 228 using device commands via a NIFTE process 232 designated for the restoration device 228. This option essentially opens a direct interface to the NIFTE process 232 for the selected restoration device 228.

The "Trace" option 1616, when selected, allows a user to monitor X.25 traffic for a selected link between a selected NIFTE process 232. When this option is selected, a trace window is displayed in the GUI interface on the RM Terminal 224. The X.25 messages for the selected link are shown on the trace window as provided by the NIFTE process 232. The "Trace" option 1616 is for troubleshooting when a device is not responding properly to a user's commands. The trace window shows all traffic being sent by the user to the device, and being sent to the user from the device as captured by the selected NIFTE process 232.

The "Audit" option 1618, when selected, allows a user to initiate an audit on one or more restoration devices 228. The RTR Server 210 automatically performs audits on a scheduled basis. The "Audit" option 1618, when selected, allows users to perform audits independent from any audit schedules. An audit window is displayed on a GUI interface on the RM Terminal 224 showing the message log that results from the audit. The NIFTE processes 232 for the selected devices performs the audit and provides the messages that are shown in the audit log. Results of the audit are written by the NIFTE processes 232 to the RTNDD 240.

The "Start/Stop" option 1620, when selected, allows a user to start or stop selected NIFTE processes 232. This can be used for maintenance tasks. The "Performance" option 1622, when selected, provides current and historical performance data on NIFTE processes 232.

The "Link Management" option 1624, when selected, allows a user to enable or disable selected X.25 links to a restoration device 222. The GUI Server 232 sends messages to the NCC process 254 to start or stop an NIFTE process 232 for a particular link.

The "Device Data" option 1626, when selected, allows a user to browse the RTNDD 240. A Device Data window is displayed which has split windows. A top window shows overall restoration device 228 data and a bottom window shows port-specific data for the restoration device 228. The "Configure Run-Time" option 1628, when selected, allows a user to configure parameters of a selected NIFTE process 232 while the NIFTE process 232 is running. The "Configure Device" option 1630 and "Configure Switch" option 1632, when selected, allow a user to configure parameters for a DXC device and RTR switch, respectively, to be read by selected NIFTE processes 232 upon start up of the selected NIFTE process 232. With these configure options, the GUI Server 234 sends updates directly to the selected NIFTE process 232 via the NCC process 254.

The "Maintain Notification" option 1634, when selected, allows the user to determine whether the GUI Server 234 is registered to receive notifications from other processes on the RTR Server 210.

Figure 17:
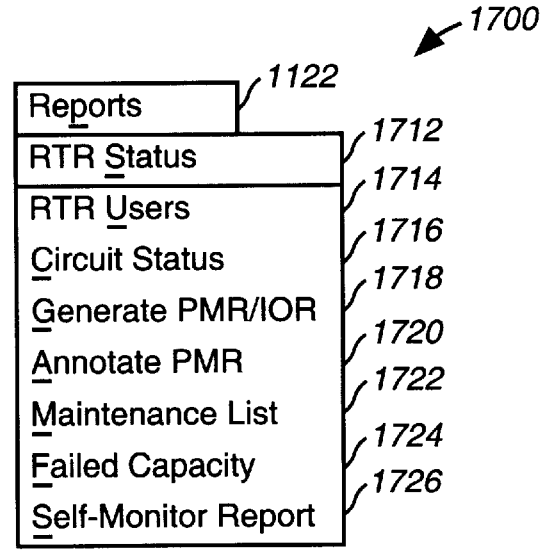
FIG. 17 shows a Reports pull-down menu of a Reports menu selection of FIG. 11.

The "Reports" option 1122 of the Main GUI window 1100 of FIG. 11 when selected allows a user to access a Reports menu 1700 as shown in FIG. 17. The "RTR Status" option 1712, when selected, allows a user to display a log of status messages. The "RTR Users" option 1714, when selected, allows a user to display a list of users currently logged on to the RTR system. The "Circuit Status" option 1716, when selected, allows a user to check the status of trunks according to circuit identification. The "Generate PMR/IOR" option 1718, when selected, allows a user to create a post-mortem report or an initial outage report. The "Annotate PMR" option 1720, when selected, allows a user to add comments and time stamps to the post-mortem report. These comments and time stamps indicate when an outage was restored and normalized. The "Maintenance List" option 1722, when selected, allows a user to display trunks that are currently undergoing maintenance. The "Failed Capacity" option 1724, when selected, allows a user to display network capacity that was unusable. The "Self-Monitor Report" option 1726, when selected, allows a user to gather tailored extracts from the post-mortem and initial outage reports.

Figure 18:
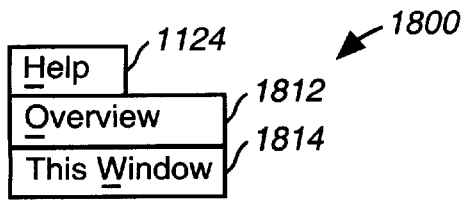
FIG. 18 shows an overvieww of a Help pull-down menu selection.

The "Help" option 1124 of the Main GUT window 1100 of FIG. 11, when selected, allows a user to access a Help menu 1800 shown in FIG. 18. The "Overview" option 1812, when selected, displays a general description of the RTR system running on the RTR Server 210. The "This Window" option 1814, when selected, displays help text specific a current window being displayed.

Referring back to FIG. 11, in addition to the pull down menus 1110 of the Main window 1100, the series of status buttons allow a user to further control and access information. The Execution State button 1132 of the Main window 1100 of FIG. 11 shows the current Execution State of the RTR Server 210 in communication with the RM terminal 224 displaying the Execution State button 1132. The Execution State of an RTR Server can be "primary" or "back up." At any one time, one server is primary and any other servers are back up. The current Execution State is maintained by the Control Manager process 244. The GUI Server process 234 retrieves an Execution State with a command/response message exchange with the Control Manager process 244. From the Main window 1100 of the GUI interface on the RM Terminal 224, a user who has authorization through password validation can select the Execution State button 1132 to change the Execution State of the RTR Server 210 in communication with the RM Terminal 224. By selecting the Execution State button 1132, a user can initiate a process fail-over in either direction between the primary and back up RTR servers. In this event, the GUI Server process 234 sends a message to the Control Manager process 244. The Control Manager process 244 performs a fail-over and changes the Execution State of the present RTR Server. The Control Manager process 244 also sends messages to the Control Manager processes of other RTR Servers to change Execution States and notifies each internal RTR component of the change in Execution State by sending a message to each internal RTR component. This is further disclosed in U.S. patent application Ser. No. 08/905,241 referenced above.

A Dynamic Route Generation (DRG) State is enabled when the DRG algorithm in the Route Generator process 914 is enabled to perform real-time restoration. It is disabled when pre-planned restoration is in place. The DRG State button 1134 of the Main window 1100 of FIG. 11 displays the current state of the DRG algorithm. A user authorized through password verification can change the DRG State of the present RTR Server 210 by selecting the DRG State button 1134. Upon selection of the DRG State status button, the GUI Server process 210 sends a message to the Control Manager process 244. In turn, the Control Manager process 244 sends a change DRG State message to the Restoration Control component 418 as further described in U.S. patent application Ser. No. 08/905,241 referenced above. The Control Manager process 244 also sends out notifications to each impacted process.

A Readiness Mode is "normal" during nominal operation and "alert" if an outage has been detected. A change in Readiness Mode is provided to the GUI Server process 210 by the Control Manager process 244 in response to an outage announcement sent by the Fault Analysis process 246. A user authorized through password verification can manually change the Readiness Mode by selecting the Readiness Mode button 1136 of the Main window 1100 of FIG. 11. The GUI Server process 210 then sends a message to the Control Manager process 244. The Control Manager process 244 in turn sends a change Readiness Mode message to all internal RTR processes to change the mode from normal to alert, or vice versa. A Current Mode Status button 1138 of the Main Window 1100 of FIG. 11 displays the current mode of the RTR processes. The current modes include demonstration and operational status.

A Link Status button 1140 of the Main window 1100 of FIG. 11 displays the status of X.25 links to the restoration devices 228. The Link Status button 1140 indicates status by the color of the button and a number displayed on the button. If any restoration device 228 is in a state in which both of its two links are not functioning, the Link Status button 1140 will be red and the number of such restoration devices 228 will be displayed on the button. If the Link Status button 1140 is not red, then the button will be yellow if any restoration device 228 is in a state in which just one of its two links is not functioning and the number of such restoration devices 228 will be displayed on the button. If the Link Status button 1140 is not red or yellow, then the button will be green, indicating that all links of the telecommunications network are functioning. The GUI Client process 226 obtains link status directly from queries to the RTNDD.

The Unapproved Pre-Plans button 1142 of the Main window 1100 of FIG. 11 shows, when selected, the number of pre-plans that have been generated in the latest pre-plan generation process run, but have not yet been approved. The RTR Server 210 does have an auto-approval method for pre-plans that fall within a threshold of change from a previous pre-plan. This threshold of change is stated as a percentage of trunks that have changed. Pre-plans that do not fall within this threshold of change must be manually approved. By selecting the Unapproved Pre-plans button 1142, a user can open a list of unapproved pre-plans.

The Plan Generator Status button 1144 indicates operational status of a process which is used for generating plans. The plan generator status is either "stop" and "running." The Alarm Status button 1146 is lit when a Restoral Set has been declared "impacted" by an outage based on alarm analysis by the Fault Analysis process 246. A user of the GUI interface of the RM Terminal 224 views and acknowledges alarms by selecting the Alarm Status button 1146 through the use of a computer input device.

The Announcements section 1150 in the Main window 1100 of the GUI of FIG. 11 shows the status of Restoral Sets selected by a user by specifying a particular view of the window. For example, a user can specify that all Restoral Sets with a status of "impacted" will be displayed in the Announcements section 1150. A user can view all of the network or just a subset of the network. If one or more Restoral Sets are listed as "impacted," the Alarm Status button 1146 is displayed as lit. The data in the Announcements list are obtained directly from the RTNDD process 240 with queries based on a user's specification of a view.

The Announcements section 1150 of the Main GUI window 1100 of FIG. 11 includes a header showing the current number of announcements, which in the case of FIG. 11, is 10. For each announcement, data fields are displayed in the Announcements section 1150 of the Main GUI window 1100 of FIG. 11. An "RS Name" data field 1152 displays a name assigned to the particular restoral set. A "Type" data field 1154 displays the type of restoral set including failure span or custom. A custom RS includes a manually assembled list of systems and trunks, in contrast to a failure span RS, which includes exactly all the systems and trunks within an isolated, unique nonbranching portion of the network. The RTR system treats a fault anywhere along one failure span as an outage.

A "State" data field 1156 displays the state of the restoral set including impacted, jeopardy, rerouted, maintenance, or normal. Impacted means that the items so marked has been classified as having an outage. Jeopardy is a status assigned by a user to an RS to indicate that an issue exists in the telecommunications network 170 that may escalate into an outage situation. For example, a train derailment could damage equipment associated with a nearby RS, whereby a user would place the RS in a jeopardy state. Rerouted means that the item so marked has its traffic running on an alternative path because of a problem on its primary path. Maintenance is a status assigned by a user to an RS to indicate that repair or maintenance operations are being performed on equipment or segments associated with the RS. Normal means that the item so marked has its traffic running on original paths and there are no outages present. Jeopardy situation monitoring and restoration is further disclosed in the current assignee's U.S. patent application Ser. No. 08/956,339, "Network Restoration Plan Regeneration Responsive to Transitory Conditions Likely to Affect Network Traffic," filed Oct. 23, 1997. A "Break Spec" data field 1158 displays details as to where a break in a link has occurred. A break can occur, for instance, at a particular station or between stations. A Status data field 1160 indicates whether status is inactive or active. An "IMP Sys" data field 1162 displays the number of systems in the particular restoral set that are effected by the state displayed in the "State" data field 1156. This value gets updated every five seconds. An "IMP Trk" data field 1164 displays a number for the trunks in this restoral set that have been effected by the state as displayed in the "State" data field 1156. This value gets updated every five seconds. An "Active" data field 1166 displays the number of traffic-bearing trunks in the restoral set. This failure gets updated every five seconds. A "Capacity" data field 1168 displays the total number of available trunks in the restoral set. This failure gets updated every five seconds.

All of the above U.S. patents and applications are incorporated by reference. While the invention is used to manage and monitor telecommunications systems involving restoration functions, the invention can similarly be used for managing and monitoring involving other telecommunications functions, such as, for example, constructing, expanding, dividing, analyzing, and upgrading telecommunications systems. Furthermore, the invention may be readily applied to a GUI system for monitoring and managing resources in a computer network, such as printers, modems, shared software applications, etc.

These and other changes can be made to the invention in light of the above-detailed description. In general, in the following claims, the terms should not be construed to limit the invention to specific embodiments disclosed in the specification and the claims, but should be construed to include all graphical user interface systems that operate under the claims to provide a system for monitoring and managing network devices in telecommunication networks. Accordingly, the invention is not limited by the disclosure, but instead its scope is to be determined entirely by the following claims.

We claim:

1. In a telecommunications network having telecommunications network devices, each telecommunications network device having a device-specific communication format for communicating via the telecommunications network, a telecommunications network monitoring and management system comprising:

a processor configured to execute telecommunications network monitoring and management processes, the processor configured to access the telecommunications network and data networks for process communications;

a plurality of device interface processes including telecommunications network analysis, restoration, and maintenance processes configured to execute on the processor, each device interface process configured to communicate with one of the telecommunications network devices and with a graphical server process of the telecommunications network monitoring and management processes, the device interface processes configured to translate communications between a communications format of the graphical server process and a device-specific communications format of one of the telecommunications network devices, the graphical server process configured to communicate with the telecommunications network devices via the device interface processes; and graphical interface processes configured to communicate with the graphical server process via the internal communications process and with user terminals via the data network wherein communications are exchanged between the user terminals and the telecommunications network monitoring and management processes and between the user terminals and the telecommunications network devices.

2. The telecommunications network monitoring or management system of claim 1 wherein the communications exchanged between the user terminals and the telecommunications monitoring or management processes and between the user terminals and the telecommunications devices include data and commands.

3. The telecommunications network monitoring or management system of claim 1 wherein the telecommunications network monitoring or management processes include a network control coordinator process configured to route communications between the graphical server process and the device interface processes.

4. The telecommunications network monitoring or management system of claim 1, including an internal communication process comprising electronic messages and electronic mailboxes.

5. The telecommunications network monitoring or management system of claim 1 wherein the communications exchanged between the user terminals and the telecommunications network monitoring or management processes and between the user terminals and the telecommunications devices include unsolicited alarms indicating problems in the telecommunications network.

6. The telecommunications network monitoring or management system of claim 1 wherein the communications exchanged between the user terminals and the telecommunications network monitoring or management processes and between the user terminals and the telecommunications devices include audit commands, and in response to the audit commands, include status information on the telecommunications network including telecommunications network link status and network device status.

7. The telecommunications network monitoring or management system of claim 1 wherein the communications exchanged between the user terminals and the telecommunications network monitoring or management processes and between the user terminals and the telecommunications devices include commands to configure the telecommunications network devices.

8. The telecommunications network monitoring or management system of claim 1 wherein the user terminals are configured to display a graphical user interface with a main window configured to integrate a plurality of windows used in monitoring or managing the telecommunications network.

9. A telecommunications monitoring and management system for monitoring and managing a telecommunications network having telecommunications network devices and resources, the system comprising:

a plurality of interface processes configured to communicate with the telecommunications network devices and resources including monitoring the network, analyzing network problems, configuring network devices and communication links, managing restoration systems, maintaining the telecommunications network, manually controlling network devices, generating restoration and restoral sets, maintenance, and operational plans, among other network analysis, restoration and particular maintenance and operations functions; and a graphical user interface system configured to provide a unified graphical user interface to communicate with the telecommunications network devices or resources via the plurality of interface processes for telecommunications network analysis, restoration, and maintenance.

10. The telecommunications monitoring or management system of claim 9 wherein the graphical user interface system is further configured to communicate with telecommunications network monitoring or management processes.

11. The telecommunications monitoring or management system of claim 9 wherein the graphical user interface system is configured to integrate access to all telecommunications network monitoring or management options and status indicators under the unified graphical user interface.

12. The telecommunications monitoring or management system of claim 9 wherein each telecommunications network device has different device-specific communication formats for communicating via the telecommunications network.

13. The telecommunications monitoring or management system of claim 9 wherein the telecommunications network monitoring or management processes comprise a control manager process, a fault analysis process, a restoration coordinator process, a verification manager process, a report manager process, a network control coordinator process, a trunk action data process, a real-time network device database process, real-time restoration database process, a pre-plan files process, or a plan manager process.

14. The telecommunications monitoring or management system of claim 9 wherein the telecommunications network monitoring or management processes comprise processes configured to communicate with external processes via a data network.

15. The telecommunications monitoring or management system of claim 9 wherein the graphical user interface system has graphical objects indicating the status of the telecommunications network.

16. The telecommunications monitoring or management system of claim 15 wherein the status of the telecommunications network comprises execution state, dynamic route generation, readiness mode, link status, pre-plan status, or alarm.

17. The telecommunications monitoring or management system of claim 9 wherein the graphical user interface system comprises a graphical user interface server, graphical user interface processes and user terminals.

18. The telecommunications monitoring or management system of claim 17 wherein the user terminals are configured to be distributed among computer data networks.

19. In a telecommunications network having telecommunications network devices, each telecommunications device having a device-specific communication format for communications via the telecommunications network and in a data network system, a telecommunications network monitoring and management method comprising:

executing telecommunications network monitoring and management processes and an internal communications process;

communicating between the telecommunications network monitoring and management processes via the internal communications process;

providing access to the telecommunications and data networks for the telecommunications network monitoring and management processes;

translating communications between a communications format of a graphical server process and device-specific communications formats of each of the telecommunications network devices wherein the graphical server process communicates with the telecommunications network devices;

communicating between the telecommunications network monitoring and management processes and the graphical server process for performing telecommunications network analysis, restoration, and maintenance communications; and communicating between the graphical server process and user terminals via the data network wherein the user terminals send and receive telecommunications network monitoring and management communications to the telecommunications network devices and the telecommunications network monitoring and management processes via the graphical server process.

20. The telecommunications network monitoring or management method of claim 19, further including:

integrating a plurality of graphical display windows under a main graphical display window wherein all graphical display windows are displayed on each of the user terminals for monitoring or managing the telecommunications network.

* * * * *